United States Patent

Fogarty, Jr.

[11] 4,070,293
[45] * Jan. 24, 1978

[54] FILTER MEDIA

[76] Inventor: John E. Fogarty, Jr., 12 Sherburne Road, Westboro, Mass. 01581

[*] Notice: The portion of the term of this patent subsequent to Mar. 8, 1993, has been disclaimed.

[21] Appl. No.: 695,942

[22] Filed: June 14, 1976

Related U.S. Application Data

[63] Continuation-in-part of Ser. No. 537,780, Dec. 31, 1974, Pat. No. 3,971,721.

[51] Int. Cl.² .............................................. B01D 33/04
[52] U.S. Cl. .................................................... 210/401
[58] Field of Search ................. 210/77, 160, 387, 400, 210/401, 447; 425/197–199

[56] References Cited

U.S. PATENT DOCUMENTS

| | | | |
|---|---|---|---|
| 3,084,987 | 4/1963 | Bounin | 210/77 X |
| 3,288,296 | 11/1966 | Hirs | 210/400 X |
| 3,471,017 | 10/1969 | Kalman | 210/77 X |
| 3,704,787 | 12/1972 | Norton | 210/387 |
| 3,855,126 | 12/1974 | Smith | 210/77 |
| 3,971,721 | 7/1976 | Fogarty, Jr. | 210/401 |

Primary Examiner—Frank A. Spear, Jr.
Assistant Examiner—Richard W. Burks
Attorney, Agent, or Firm—Thompson, Birch, Gauthier & Samuels

[57] ABSTRACT

A filter element for use in a filter for pressurized material in flowable form is disclosed. The filter element includes an elongated perforate web adapted to move longitudinally across the flow axis of the material being filtered and to accommodate filtered flow therethrough of the material. A plurality of seal members are fixed to the perforate web transversely to and at spaced intervals along the longitudinal axis thereof. The perforate web extends continuously and uninterruptedly across the seal members to thereby provide the sole and exclusive means of interconnection therebetween. The seal members preferably have a thickness at least as great or greater than the thickness of the perforate web, and preferably the ends of the seal members protrude laterally beyond the side edges of the perforate web.

21 Claims, 13 Drawing Figures

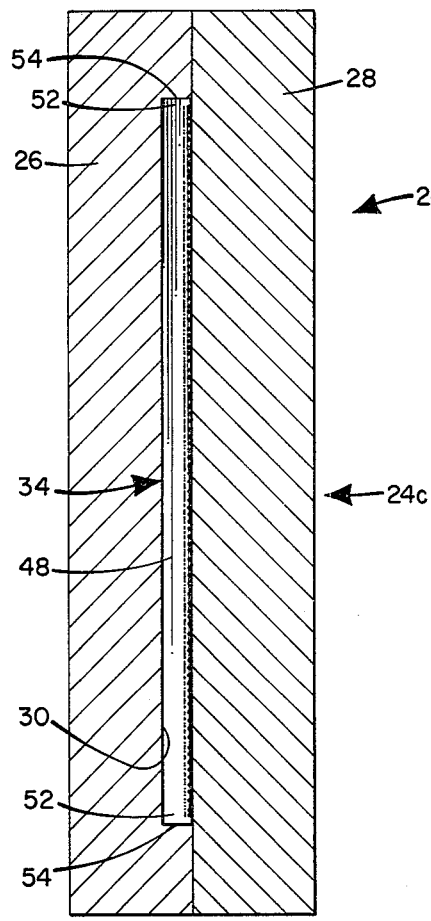
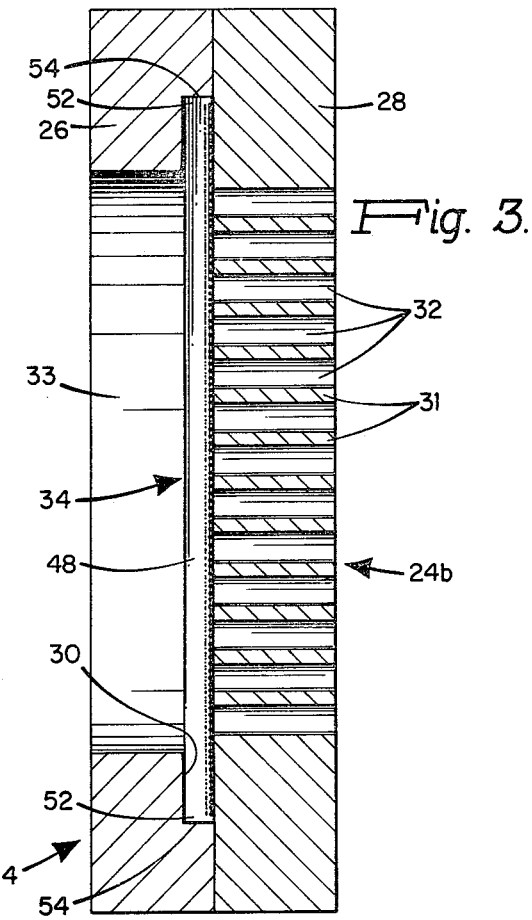
Fig. 2.
Fig. 3.
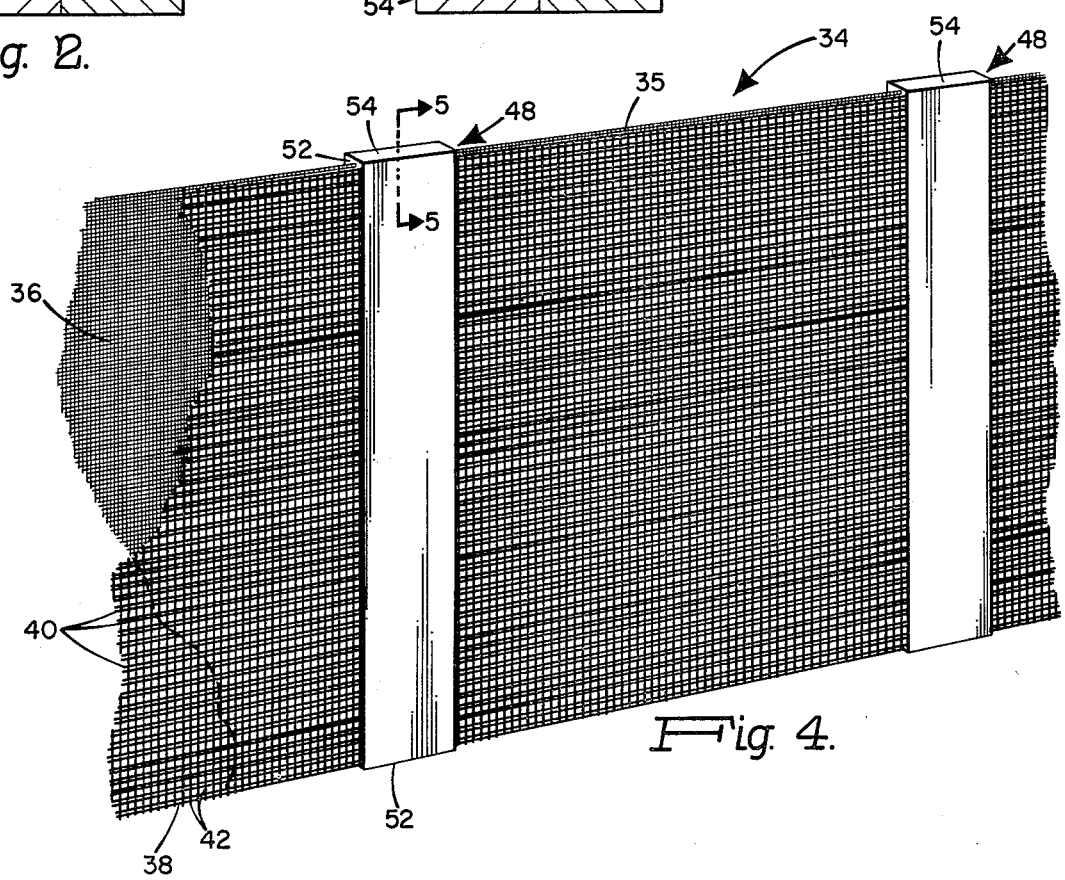
Fig. 4.

FILTER MEDIA

CROSS REFERENCE TO RELATED APPLICATION

This application is a continuation-in-part of U.S. application Ser. No. 537,780 filed Dec. 31, 1974, now U.S. Pat. No. 3,971,721 patented July 27, 1976.

BACKGROUND OF THE INVENTION

This invention relates generally to the art of filtering, and is concerned in particular with the filtering of pressurized material in flowable form.

There are numerous commercial operations dealing with pressurized materials in flowable form where filter elements are employed to remove contaminants, impurities, etc. When the filter elements become clogged, they must be replaced, cleaned or renewed, and with certain operations this can present serious problems. An example of one such operation is the filtering of molten plastic being fed from an extruder, melt pump or the like to a die producing any one of a wide range of products, such as for example blow-molded bottles, thin-film plastic bags, etc. In operations of this type, the molten plastic is passed at elevated temperatures in excess of 200°–300° F. and high pressures typically on the order of 1000 to 5000 p.s.i. through a filter apparatus located between the extruder or melt pump and the molding machine. In addition to effectively removing contaminants from the melt stream, the filter apparatus must also operate safely and continuously over extended periods of time, with a minimum substantially constant pressure drop across the filter element. By minimizing the pressure drop across the filter element, the volume of plastic flow to the molding machine is maximized, thereby permitting higher production rates. Maintaining the pressure drop substantially constant simplifies the task of controlling the operation of equipment on both the upstream and downstream sides of the filter.

The prior art filter devices which have heretofore been developed have failed to meet the criteria of successful operation outlined above. More particularly, in earlier devices of the type described in U.S. Pat. No. 642,814, separate filter screen elements are located in two laterally spaced positions on a shuttle plate which can be reciprocated in opposite directions transverse to the flow axis of the material being filtered. Such devices are characterized by numerous drawbacks, including pronounced fluctuations in feed pressures to downstream equipment due to infrequent changes of clogged filter screen elements, difficulties in cleaning and/or replacing clogged filter screen elements, and dangerous leakage of hot high pressure molten material when the shuttle plate is shifted.

The filter devices described in U.S. Pat. Nos. 3,471,017 and 3,855,126 represent efforts to provide improved alternatives to the earlier devices employing shuttle plates. However, these later devices have also fallen short of providing a satisfactory solution due to their reliance on the solidification of plugs of molten material to provide seals for elongated filter screens being moved across the flow path of the material being filtered. The cool/heat cycles required to alternately set and melt such seals are difficult to control, particularly at the frequencies required to move the filter screens at sufficiently rapid intervals to avoid undesired pressure drops caused by the filter screens becoming clogged. If the cool/heat cycles are not carefully controlled, the sealing integrity provided by the seals is lost. When this occurs, even momentarily, operating personnel are exposed to a dangerous escaping stream of high temperature high pressure molten plastic, and the operating cycle of both upstream and downstream equipment is disrupted with attendant production losses.

The above problems were eventually solved by the filter described and claimed in copending application Ser. No. 537,780. With this improved filter, pressurized flowable material is conducted to and from a filter zone respectively by inlet and discharge pressure conduits. A filter element including an elongated perforate web is driven in one direction, either continuously or intermittently, into and out of the filter zone through respective entry and exit sections of a guide channel. The perforate web extends transversely across the fluid flow path, preferably while engaged upon a downstream perforate support member. A plurality of seal members extend across the perforate web transversely to and at fixed spaced intervals along the longitudinal axis thereof. The seal members are suitably dimensioned to cooperate in internal sealing engagement with imperforate walls of the guide channel sections.

By employing an elongated perforate web movable either continuously or intermittently across the filter zone, a readily replaceable fresh filter medium is available, with the result that the pressure drop across the filter apparatus is kept at a relatively constant minimum level. This maximizes the flow of the material being filtered, and also facilitates control of both upstream and downstream equipment. In addition, the pressurized flow of material is effectively contained by the internal sealing engagement of the seal members with the imperforate walls of the guide channel, the entry and exit sections of which have lengths with relation to the spacing between the seal members which insure that at least one seal member is present in each channel section at all times during the filtering operation. Reliance on temperature-sensitive plugs of flowable material, and the problems associated therewith, is thus avoided.

The present invention is directed to the filter element adapted for use with the filter apparatus described and claimed in the aforesaid copending application.

The filter element includes an elongated perforate web adapted to move longitudinally across the flow axis of the material being filtered and to accommodate filtered flow therethrough of the material. A plurality of seal members are fixed to the perforate web transversely to and at spaced intervals along the longitudinal axis thereof. The perforate web extends continuously and uninterruptedly across the seal members to thereby provide the sole and exclusive means of interconnection therebetween. The seal members preferably have a thickness at least as great or greater than the thickness of the perforate web.

The perforate web may comprise a single perforate strip, or alternatively, it may include a plurality of superimposed perforate strips held together at spaced intervals by the seal members. The perforate strips may comprise metal wire mesh, or other suitable filter media, including sintered metal, perforated metal, woven synthetic or natural filter materials, foamed materials, microporous plastics, etc.

At least one of the perforate strips making up the perforate web has high tensile strength characteristics in order to interconnect the seal members in a manner which enables them to withstand high operating pressures and also to enable the filter element to be driven longitudinally through the guide channels and across the filter zone. Such high strength tensile characteristics may be obtained by employing laterally spaced tension members, for example high strength metal wires, which extend longitudinally and continuously over the entire length of the perforate web, and which are held in laterally spaced relationship by woven fill wires and/or by the seal members. Alternatively, the perforate web may include a strip of perforated metal, plastic tape or any other suitable perforated material having the desired tensile strength characteristics.

In comparison to the perforate web, the seal members are relatively rigid and may be formed from any suitable material, or combination of materials including poly amide imide, metal, rubber, leather or fabrics. The seal members are preferably wider than the perforate web, with the ends of the seal members protruding laterally from the edges of the perforate web to locate, guide and resist twisting of the perforate web. The seal members may be fixed to the perforate web by any one of a number of known techniques, including thermal bonding, brazing, solvent welding, adhesion, sonic welding, molding in place, etc. The seal members may be either imperforate or perforate. Optionally, the seal members may be provided with lips which are adapted to be urged by the pressurized material outwardly away from the perforate web and into sealing engagement with surrounding guide surfaces. Preferably, the perforate web is located by the seal members in a plane at or close to the downstream sides of the seal members.

The filter element of the present invention is ideally suited for, although not limited to, filtering operations at elevated temperatures in excess of 200°-300° F, and at pressures typically on the order of 1000 to 5000 p.s.i. and higher.

BRIEF DESCRIPTION OF THE DRAWINGS

FIGS. 2 and 3 are sectional views on an enlarged scale taken along lines 2—2 and 3—3 of FIG. 1;

FIG. 4 is a view in perspective of a filter element in accordance with the present invention, with portions of the filter strip and carrier strip broken away;

DETAILED DESCRIPTION

Figure 1:
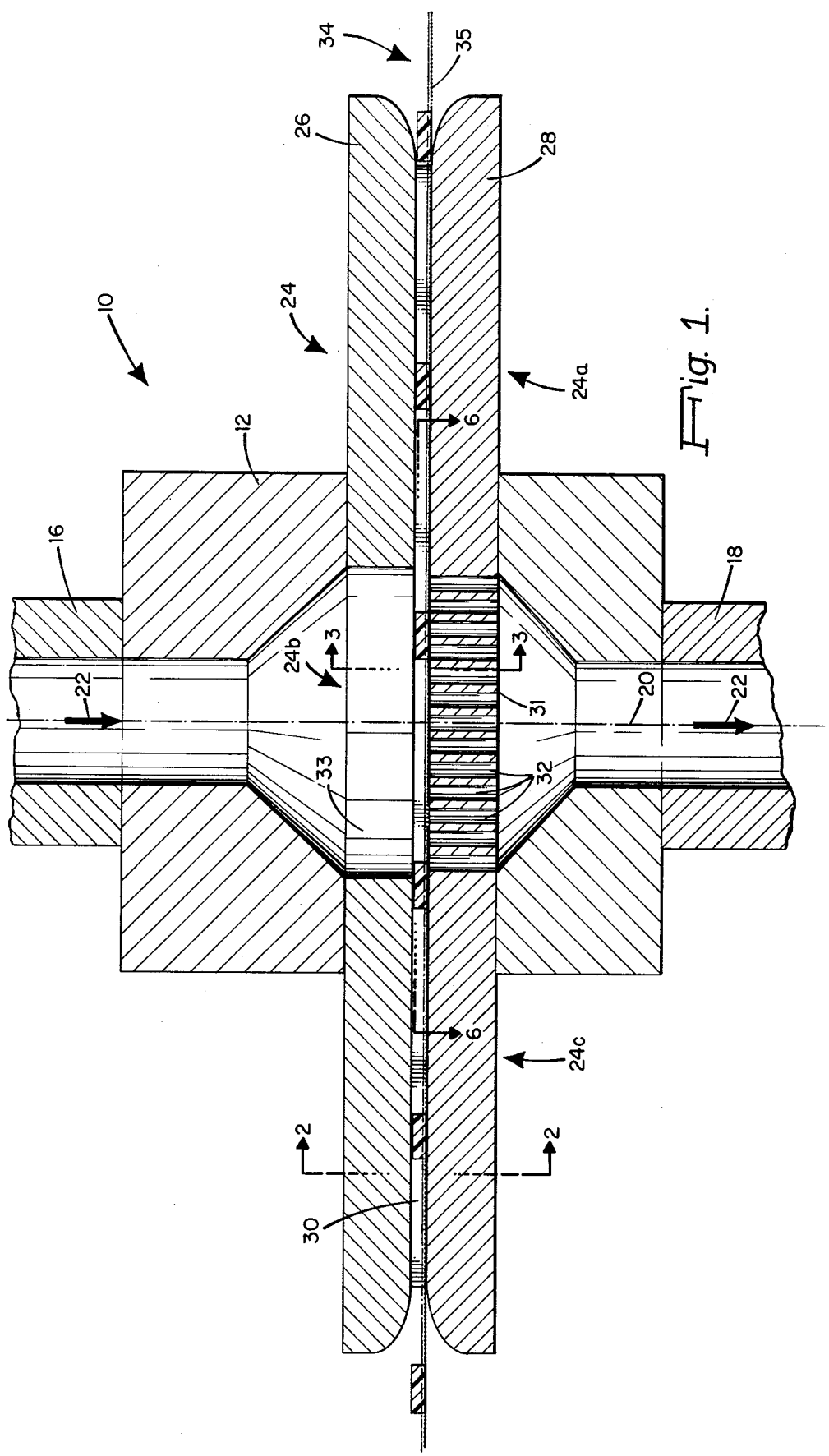
FIG. 1 is a horizontal cross-sectional view taken through a filter employing the filter element of the present invention.

Referring initially to FIGS. 1 to 3 there is shown at 10 a filter apparatus of the type disclosed and claimed in copending application Ser. No. 537,780. The filter apparatus includes a housing 12 defining an internal filter zone or chamber 14. Inlet and discharge pressure conduits 16 and 18 are connected to the housing 12 in communication with the filter zone. The conduits 16 and 18 establish a flow axis 20 for the material being filtered, the direction of material flow being indicated by arrows 22.

An elongated guide 24 extends through the housing 12 in a direction transverse to the flow axis 20. The guide is comprised of mating walls 26, 28 which define a guide channel 30. The guide 24 has an entry section 24a leading into one side of the filter zone, an intermediate section 24b extending across the filter zone, and an exit section 24c leading out from the opposite side of the filter zone. The walls forming the entry and exit sections 24a, 24c are imperforate, whereas at the intermediate section 24b, wall 28 forms a "backer plate" 31 which is perforated as at 32, and wall 26 has an enlarged opening 33 therein opposite to the backer plate. Optionally, the backer plate can comprise a piece which is separate from wall 28.

A filter element 34 in accordance with the present invention is adapted to move longitudinally through the entry section 24a, across the filter zone 14 along the upstream face of the backer plate 31 and through exit section 24c. Any conventional means (not shown) may be employed to move the filter element, either continuously or intermittently, along the above-described path. The pressurized material in flowable form enters the filter zone 14 through inlet conduit 16, and after being filtered by passing through the filter element 34, leaves the filter zone through discharge conduit 18.

A preferred embodiment of the filter element 34 which is ideally suited for the high temperature and high pressure operating conditions found in the plastic or rubber industries will now be described with additional reference to FIGS. 4-6. The filter element 34 includes a web 35 made up of a perforate filter strip 36 superimposed on a perforate carrier strip 38. The filter and carrier strips 36, 38 are arranged upstream and downstream respectively in relation to the flow axis of pressurized flowable material passing therethrough. The downstream carrier strip 38 is of a relatively heavy wire mesh, having wires 40 extending longitudinally and continuously with respect to the length of the web 35. The tension wires are held in laterally spaced relationship by fill wires 42.

Figure 5:
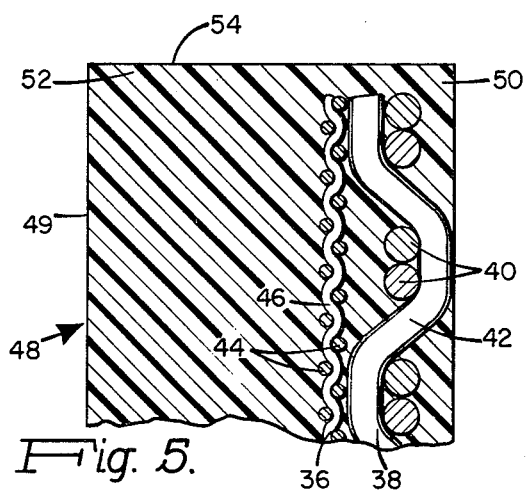
FIG. 5 is a sectional view on an enlarged scale taken along lines 5—5 of FIG. 4.
Figure 6:
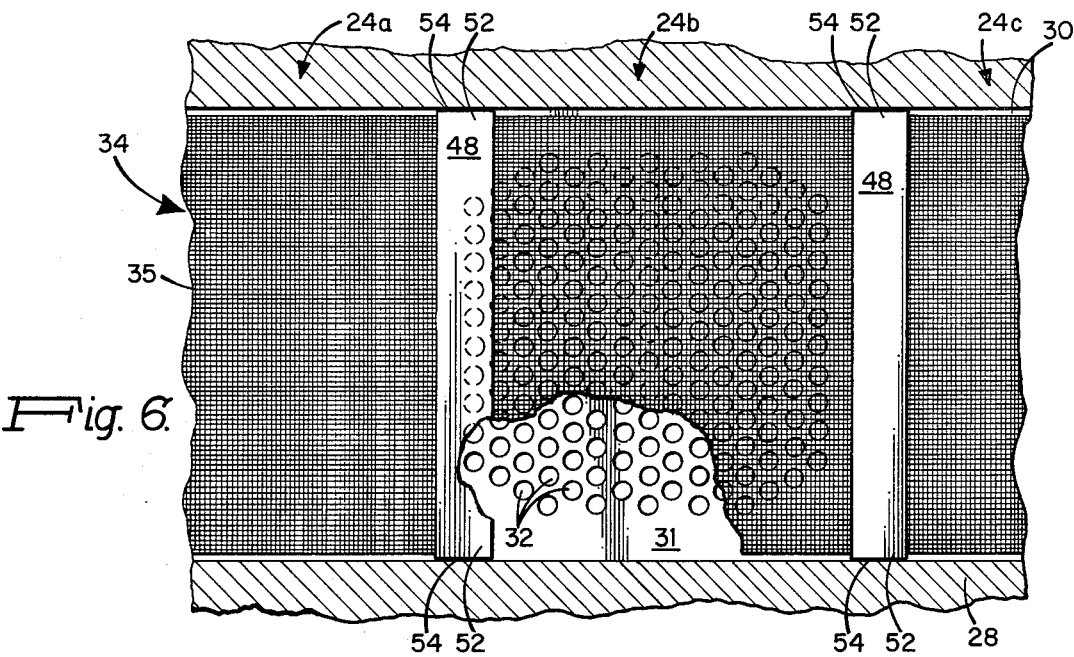
FIG. 6 is a sectional view taken along lines 6—6 of FIG. 1.

The filter strip 36 is comprised of a finer wire mesh having tension wires 44 and fill wires 46 (See FIG. 5).

The filter strip 36 and the carrier strip 38 are held together at spaced intervals along the lengths thereof by seal members 48 which are fixed to and which extend across the width of the web 35 transversely to the longitudinal axis thereof. Preferably, the seal members 49 comprise relatively narrow rigid strips of a thermally formable or moldable material such as for example poly amide imide. The seal members may be fixed in place by heating and pressing them downwardly onto the superimposed filter and carrier strips 36, 38. In this manner, as is best shown in FIG. 5, the filter strip 36 is held against the carrier strip 38, and the carrier strip is located at or directly adjacent to the downstream side 50 of the seal member 48. The seal material penetrates through the interstices of both strips, and the metal wires of both strips are either completely or at least partially embedded in the seal material, thereby providing an intimate mechanically interlocked connection between the seal members 48 and the wires of the strips 36, 38 making up the web 35.

The web 35 extends continuously and uninterruptedly across the seal members 48. In this manner, the seal members are interconnected solely and exclusively by the web, the latter having its edges between the seal members free and unsupported by braces or connecting members extending between the seal members.

The seal members 48 have a thickness as defined by their upstream and downstream sides 49, 50 (see FIG. 5) which is sufficient to permit the seal members to cooperate in internal sealing engagement with the imperforate walls of the entry and exit guide channel sections 24a, 24c. This thickness is preferably at least as great or greater than the thickness of the web 35. Preferably the widths of the seal members are also slightly greater than the width of the web, thus providing seal end sections 52 which protrude laterally beyond the side edges of the web. The end faces 54 of the seal members may either be flat as illustrated, or of any other suitable configuration, for example rounded, so as to cooperate along with the upstream and downstream sides 49, 50 in internal sealing engagement with the imperforate walls of the guide sections 24a, 24c. This internal sealing engagement between the seal members 48 and the guide surfaces of channel 30 when combined with the intimate bonding of the seal members to the tension wires 40 of the carrier strip 38, provides the necessary sealing integrity and strength to contain the pressurized flowable material in the filter zone 14. Other significant advantages are also provided by this arrangement. For example, the pressure of the material acting in opposite directions on the seal members 48 keeps the web 35 in tension, thus insuring that it lies flat against the upstream face of the backer plate 31. Where a backer plate is employed, this eliminates or at least reduces dimpling of the web 35 into the backer plate orifices 32. However, should dimpling occur, the resulting stresses in the longitudinal direction of the web 35 tend to be isolated between the seal members 48, thereby minimizing distortion of the web.

The seal members 48 also stiffen the web 35. This, when combined with the guiding relationship provided at the sliding interface between the seal ends 54 and the guide channel 30 (see FIG. 6) resists any tendency that the web 35 might have to twist while passing through the filter zone. This is particularly important if the filter is installed downstream from an extruder, where twisting of the web can be caused by the viscosity of the material being filtered in combination with the rotational discharge of the extruder screw. Under these circumstances, the free edges of the web 35, between seal members 48 are less susceptible to being twisted or distorted by the material being filtered. Such would not be the case if the side edges of the web were enclosed by additional longitudinally extending supports or seals.

The seal members 48 also reduce movement of the strip wires relative to each other as they are exposed to the material being filtered, thus assisting in maintaining a proper filtration size as defined by the interstices of the strip wires. The laterally protruding ends 52 of the seal members also serve to maintain a small clearance between the side edges of the web 35 and the walls of the guide channel 30. This prevents the edges of the web from wearing a groove into the channel walls. Also, by thus maintaining the web in proper alignment, frictional resistance to continuing or intermittent movement of the filter element is reduced significantly.

The seal members 48 also scrape the guide channel walls and the backer plate orifices 32. Contaminants are thus positively carried out of the filter zone 14. In polymer filtration, this scraping action also reduces the possibility of material stagnation and degradation, with consequent fouling of dies and the end product.

The use of seal members fixed at intervals along the length of the web 35 in internal sealing engagement with the imperforate walls of the guide channel sections 24a, 24c allows for immediate start-up of process equipment and movement of the filter element when needed without first having to wait for operating conditions to stabilize, as is the case with the prior art arrangement relying on thermally set sealing plugs formed from the material being processed.

Although seal members fabricated from a material such as poly amide imide are considered preferable for use with a web made up of superimposed strips of wire mesh, particularly for the filtering of high temperature, high pressure plastics, it will be understood that other seal materials may be employed, depending on the temperature/pressure conditions of the filtering operation, the type of material being filtered, and the materials making up the perforate web. Examples of other seal materials include metal, glass filled teflon, polyarlsulfone, etc. Depending on the type of seal material being employed, the seals may be fixed to the web by any one of a number of other known techniques, including adhesion, brazing, molding in place, etc. Under certain circumstances, it may be desirable to removably attach the seal members to the web, thereby allowing the seal members to be reused.

Figure 7:
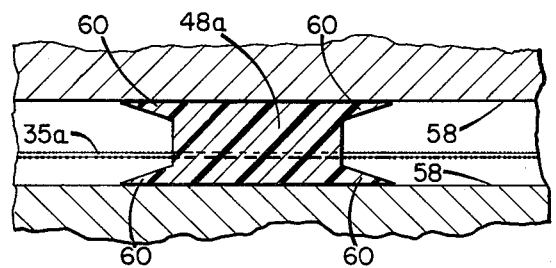
FIG. 7 is a sectional view taken through an alternate embodiment of a seal member.

Referring now to FIG. 7, an alternate embodiment of a seal member is shown at 48a fixed to a perforate web 35a and in position between the side walls 58 of a guide channel section. The leading and trailing sides of the seal 48a are provided with sharply tapered lips 60 which are adapted to be urged by the fluid pressure of the material being filtered outwardly away from the web 35a and into sealing engagement with the walls 58.

Figure 9:
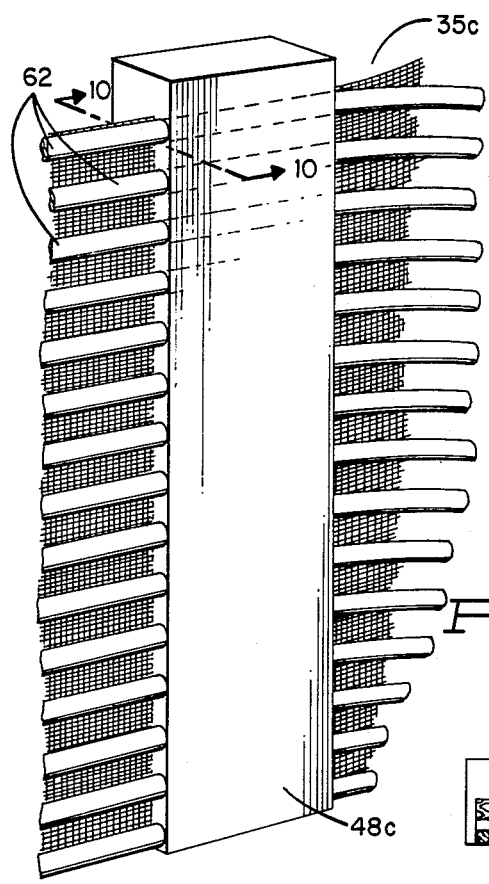
FIG. 9 is a view in perspective of another embodiment of a filter element in accordance with the present invention.
Figure 10:
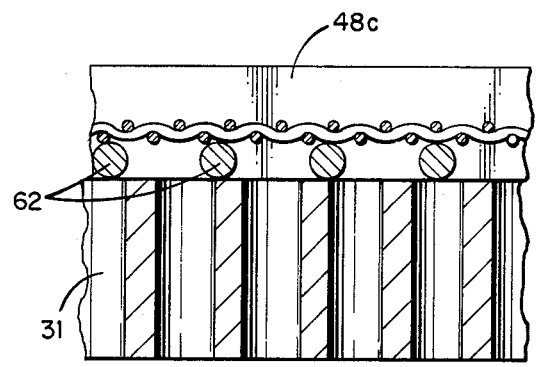
FIG. 10 is a sectional view taken along lines 10—10 of FIG. 9, showing the filter element supported on a breaker plate.

FIGS. 9 and 10 illustrate another embodiment of a filter element which differs from the embodiment illustrated in FIGS. 4 and 5 in that the web 35c has a carrier strip comprised exclusively of laterally spaced tension members 62 extending longitudinally and continuously along the length of the web, with the lateral spacing between the tension members 62 being maintained exclusively by the seal members 48c. As shown in FIG. 10, with this arrangement the tension members 62 will act as rails which will slide longitudinally across the face of the backer plate 31, thereby reducing frictional resistance as compared with that experienced with a carrier web having tension members which are laterally spaced by interwoven fill wires.

The carrier strip need not necessarily include tension members such as the wires 40 and 62. Alternatively, the carrier strip might be comprised of a perforated belt of thin metal or of some other material having sufficient tensile strength for a particular filtering operation.

Figure 8:
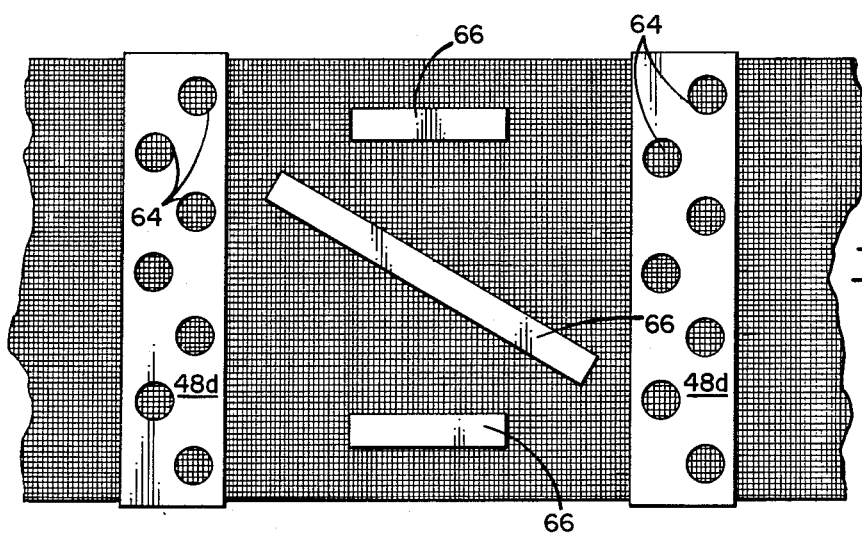
FIG. 8 is a plan view of an alternate embodiment of a filter element in accordance with the present invention.

FIG. 8 discloses another embodiment of a filter element wherein the seal members 48d are perforated as indicated typically at 64. Although shown in circular form, it will be understood that the perforations 64 may have any suitable configuration and/or distribution in order to maintain proper seal strength. The perforations 64 will conserve seal material and at the same time, minimize any interruption or pressure drop occasioned by the transverse movement of a seal member across the filter zone.

Again with reference to FIG. 8, it may be desirable to provide additional narrow strengthening members 66 between seal members 48d. The strengthening members 66 preferably will be of a thickness less than the seal members, and will act to further stiffen the web and to aid in lifting the web over or out of the orifices 32 in the backer plate 31.

Figure 11:
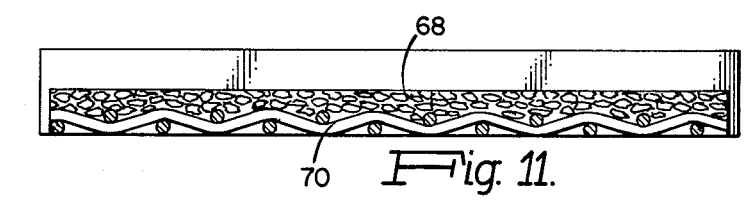
FIG. 11 is a sectional view taken through another embodiment of a filter element in accordance with the present invention.

The filter element of the present invention makes it possible to use a wide range of filter strips, either alone or in combination with a carrier strip. For example, as illustrated in FIG. 11, the filter strip 68 may comprise sintered metal supported on a wire mesh carrier strip 70. Other filter strip materials might include orientated polypropulene, polyester and nylon, perforate metal strips, microporous plastics, woven fabrics (natural and synthetic), foamed urethanes, thermoplastics, thermoset materials, etc. By properly selecting an appropriate material for the filter strip, the filter element can be employed to filter a wide range of flowable materials in either liquid or gaseous form.

Figure 12:
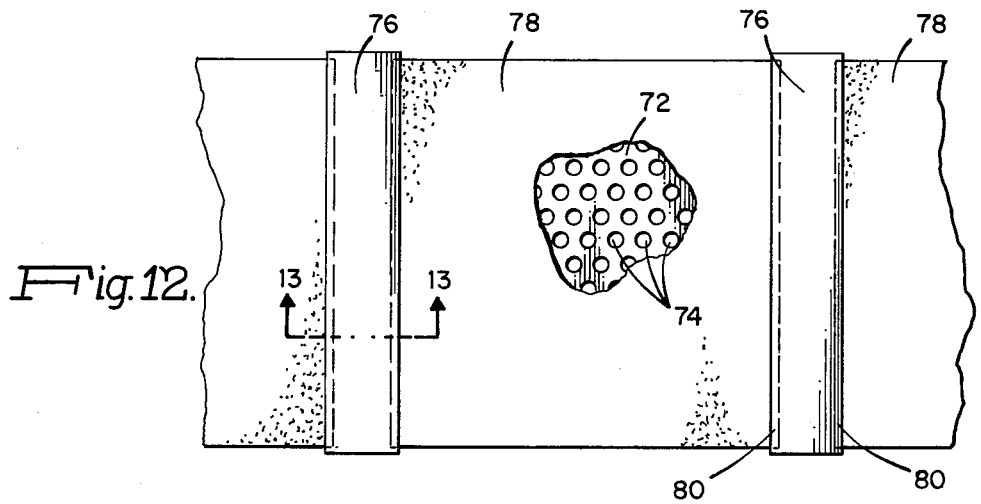
FIG. 12 is a plan view with portions broken away of another embodiment of a filter element in accordance with the present invention; and, FIG. 13 is a sectional view on an enlarged scale taken along lines 13—13 of FIG. 12.
Figure 13:
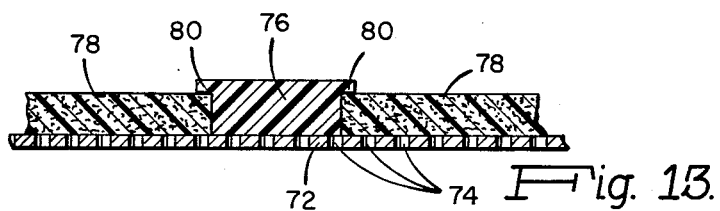

Referring now to FIGS. 12 and 13, another embodiment of a filter element in accordance with the present invention is shown comprising a carrier strip 72 perforated as at 74. Seal members 76 are fixed to the carrier strip 72. The carrier strip 72 extends continuously and uninterruptedly across the seal members 76. The carrier strip and the seal members may consist of plastic, metal or any other material having suitable properties for use in the contemplated filtering operation. Segments of cellular filter material 78 overlie the carrier strip 72 between the seal members 76. The cellular material may consist of foamed urethanes, thermoplastic rubbers, etc. Preferably, the seal members 76 have undercut sides which provide flanges 80 adapted to overlap the ends of each segment of cellular material, the latter being fixed in place by any convenient means suited to the materials employed.

In light of the foregoing description, it will now be appreciated by those skilled in the art that the filter element of the present invention is ideally suited for the high pressure and high temperature filtering operations, examples of which are filtering operations in the plastic and rubber industries. However, by selecting appropriate web and seal materials, the filter element of the present invention can be advantageously employed in many other areas where filtering of pressurized material in flowable form is required.

It is my intention to cover all changes and/or variations of the embodiments of the invention herein disclosed, and all other embodiments of the invention, which do not depart from the scope of the claims appended hereto.

I claim:

1. For use with an apparatus for filtering pressurized material in flowable form, the said apparatus having means for forming a filter zone, pressurized inlet and outlet conduit means for directing a flow of said material through said filter zone, and elongated channel means extending transversely in relation to the flow axis of said conduit means, said channel means having imperforate walls forming entry and exit channel sections in communication at opposite sides with said filter zone, a filter element for filtering said pressurized material, said filter element being adapted to move longitudinally through said entry channel section, across said filter zone and through said exit channel section, said filter element comprising: an elongated perforate web adapted to accommodate filtered flow therethrough of said pressurized material, a plurality of imperforate seal members fixed to the perforate web transversely to and at spaced intervals along the longitudinal axis thereof, said seal members being dimensioned to cooperate in internal sealing engagement with said imperforate walls, said perforate web extending continuously and uninterruptedly across said seal members to provide a means of interconnection therebetween.

2. The filter element as claimed in claim 1 wherein said seal members have a thickness which is at least as great as the thickness of said perforate web.

3. The filter element as claimed in claim 1 wherein said seal members are interconnected exclusively by said perforate web.

4. The filter element as claimed in claim 1 wherein said perforate web is comprised in part of tension members extending longitudinally and continuously along the length thereof, said seal members being intimately bonded to said tension members.

5. The filter element as claimed in claim 4 wherein said tension members comprise metal wires.

6. The filter element as claimed in claim 5 wherein the metal wires comprising said tension members are interconnected by metal fill wires extending laterally across and spaced longitudinally along the length of said web, the interstices between said wires being of appropriate size to accommodate passage therethrough of said pressurized material.

7. The filter element as claimed in claim 5 wherein said metal wires are at least partially embedded in said seal members.

8. The filter element as claimed in claim 1 wherein said perforate web is comprised of a plurality of superimposed perforate strips held together at spaced intervals by said seal members.

9. The filter element as claimed in claim 1 wherein with respect to the direction of flow of pressurized material through said perforate web, said seal members are provided with upstream and downstream surfaces defining a thickness which is greater than the thickness of said perforate web, and wherein said perforate web is located by said seal members in a plane which is closer to said downstream surfaces than to said upstream surfaces.

10. The filter element as claimed in claim 1 wherein said seal members are perforated.

11. The filter element as claimed in claim 1 wherein said seal members are provided with lips adapted to be urged away from said perforate web by said pressurized material.

12. The filter element as claimed in claim 1 wherein additional strengthening members are fixed to said perforate web at locations intermediate said seal members, said strengthening members having a thickness less than the thickness of said seal members.

13. The filter element as claimed in claim 1 wherein said seal members are provided with end sections which protrude laterally beyond the side edges of said peforate web.

14. The filter element as claimed in claim 1 wherein with regards to the direction of flow of pressurized material, said perforate web is comprised of an upstream perforate filter strip and a downstream perforate carrier strip.

15. The filter element as claimed in claim 14 wherein said filter strip is comprised of a metal wire mesh extending longitudinally and continuously with respect to the length of the perforate web, said filter strip and said carrier strip being held together at spaced intervals by said seal members.

16. The filter element as claimed in claim 14 wherein said filter strip is comprised of sintered metal.

17. The filter element as claimed in claim 14 wherein said filter strip is comprised of cellular foamed material.

18. The filter element as claimed in claim 1 wherein with regards to the direction of flow of pressurized material, said perforate web includes a downstream carrier having laterally spaced tension members extending longitudinally and continuously along the length of said perforate web, and at least one upstream perforate filter strip, said filter strip and said tension members being permanently and intimately bonded together by said seal members.

19. The filter element as claimed in claim 18 wherein said seal members are thermally formed into the perforations of said filter strip and the spaces between said tension members.

20. the filter element as claimed in claim 19 wherein the lateral spacing between said tension members is maintained exclusively by said seal members.

21. For use with an apparatus for filtering pressurized material in flowable form, the said apparatus having means for forming a filter zone, pressurized inlet and outlet conduit means for directing a flow of said material through said filter zone, and elongated channel means extending transversely in relation to the flow axis of said conduit means, said channel means having imperforate walls forming aligned entry and exit channel sections in communication at opposite sides with said filter zone, a filter element for filtering said pressurized material, said filter element being adapted to move longitudinally through said entry channel section, across said filter zone and through said exit channel section, said filter element comprising:
 a. an elongate continuous perforate web adapted to accommodate passage therethrough of said pressurized material, said perforate web being thinner and narrower than the corresponding internal dimensions of the imperforate walls forming said channel sections; and,
 b. a plurality of seal members permanently fixed to and extending across said perforate web transversely to the longitudinal axis thereof, said seal members being interconnected by and being spaced at intervals along the length of said perforate web, said seal members being thicker and wider than the corresponding external dimensions of said perforate web and being adapted to cooperate in internal sealing engagement with said imperforate walls.

* * * * *